June 4, 1968 R. F. LACEY 3,387,130

ATOMIC BEAM TUBE HAVING A SOURCE AND AN ANNULAR COLLIMATOR

Filed Sept. 28, 1964 2 Sheets-Sheet 1

INVENTOR.
RICHARD F. LACEY

BY [signature]

ATTORNEY

June 4, 1968 R. F. LACEY 3,387,130

ATOMIC BEAM TUBE HAVING A SOURCE AND AN ANNULAR COLLIMATOR

Filed Sept. 28, 1964 2 Sheets-Sheet 2

INVENTOR.
RICHARD F. LACEY
BY
ATTORNEY

United States Patent Office 3,387,130

Patented June 4, 1968

3,387,130

ATOMIC BEAM TUBE HAVING A SOURCE AND AN ANNULAR COLLIMATOR

Richard F. Lacey, Salem, Mass., assignor, by mesne assignments, to Hewlett-Packard Company, Palo Alto, Calif., a corporation of California Filed Sept. 28, 1964, Ser. No. 399,732
2 Claims. (Cl. 250—41.3)

ABSTRACT OF THE DISCLOSURE

An atomic beam tube in which the atoms emerging from the source go through an annular collimator to form an atomic beam having a large cross-sectional area. The atoms that have undergone the desired transition are detected by a button detector.

This invention relates to atomic frequency standards and in particular to a new and improved cesium beam tube that may be adapted to a frequency standard system.

Detailed description of atomic frequency standards or clocks utilizing cesium beam tubes is set forth in U.S. patent applications Ser. No. 233,573, filed Oct. 20, 1962, now issued as U.S. Patent 3,323,008, and Ser. No. 340,767, filed Jan. 28, 1964, now issued as U.S. Patent 3,354,307, both assigned to the same assignee as the present invention.

Basically, an atomic frequency standard includes an atomic resonator that provides an extremely precise resonance frequency, the resonator being coupled in a feedback loop to a primary oscillator. The oscillator is modulated at a prescribed frequency and the resonator develops an error signal at the modulation frequency. This error signal serves to adjust and stabilize the oscillator to a frequency related to the resonant frequency.

In one form of frequency standard, or clock, a cesium atomic beam is employed wherein cesium atoms undergo a desired transition at the resonant frequency. In such known systems the design used is such that most of the atoms reaching the detector are those which have undergone the desired transition, while those which fail to undergo the transition for the most part cannot reach the detector. Such a system is known as a "flop-in" system. Alternatively, the system could be designed so that those atoms that would have reached the detector if they had not undergone the transition fail to reach the detector if they undergo the transition. Such a system is known as a "flop-out" system.

In an atomic beam system, there is a great inherent advantage in using a "flop-in" design. The flop-in design is preferred since a greater signal-to-noise ratio is realized than when using a flop-out arrangement.

Another desirable feature of atomic beam tubes is the use of multipole state selector magnets. Such magnets, which may be quadrupole or hexapole in nature, provide greater deflecting forces than dipole magnets for the same or larger solid angles. However, when multipole state selector magnets are employed in a flop-in design, it is necessary to have a large area detector, especially when a conventional point or small area source of atoms is utilized. When a large area detector is used in an atomic beam clock, an excessive amount of power is needed, and the collection of ions from the large area detector is more difficult than from a small area detector.

An object of this invention is to provide an improved atomic beam tube for a frequency standard.

Another object of this invention is to provide an improved signal-to-noise ratio in an atomic beam frequency standard.

According to this invention an atomic beam tube that may be utilized in a frequency standard comprises a ring-like source of atoms, such source having a relatively large aperture; a small button detector; and a "flop-in" beam system wherein the atoms are deflected towards the optical axis of the tube as they approach the detector.

Atoms which undergo a desired energy transition at a resonant frequency provided at a region of interaction between the beam and a magnetic field, located intermediate the first and last state selector magnets, are deflected and focused onto the small area detector. The atoms impinging on the detector are ionized and then are deflected by means of a mass spectrometer to an electron multiplier. The multiplier produces an output signal which serves to stabilize a primary oscillator that is coupled in a feedback loop to the cesium beam resonator.

The invention will be described in greater detail with reference to the drawing in which.

Figure 1:
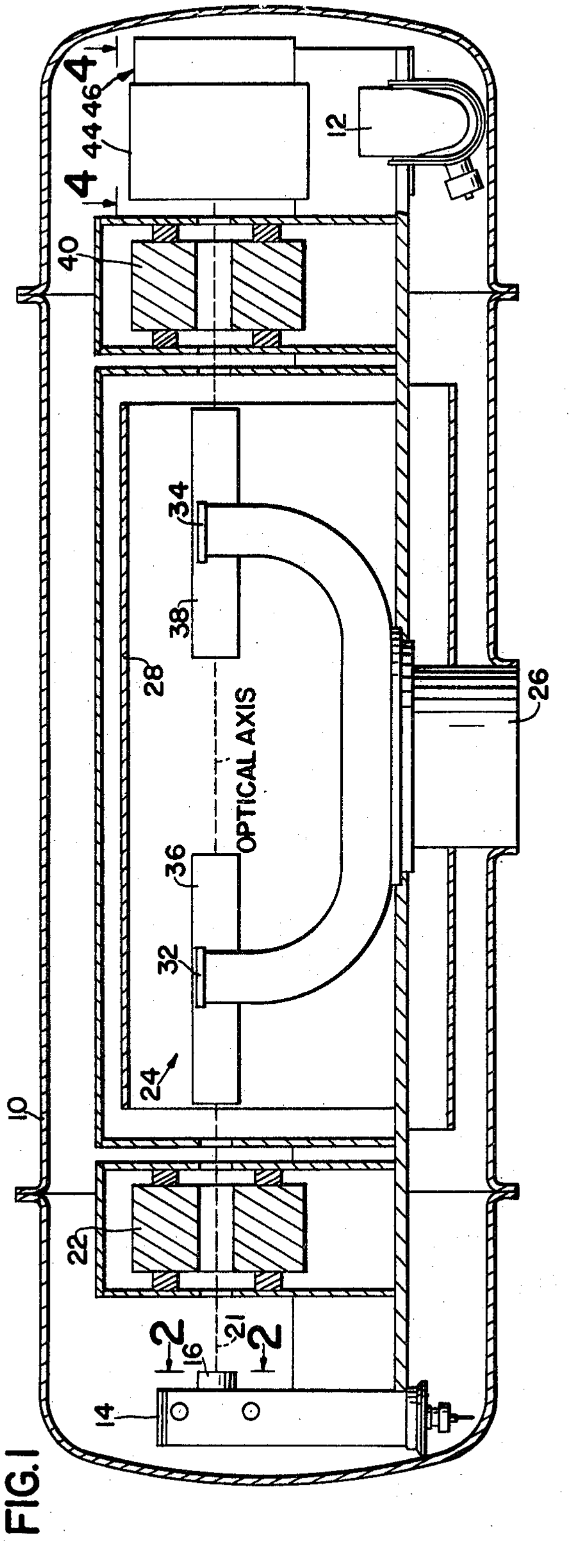
FIG. 1 is a longitudinal cross-sectional view of an atoms beam tube in accordance with this invention.

In FIG. 1, a cesium beam tube comprises a nonmagnetic envelope 10 made from stainless steel, for example, which is kept at a low pressure, such as $10^{-7}$ millimeters of mercury by means of an evacuation pump, such as a Varian Associates VacIon® high vacuum pump 12. At one end of the envelope 10, cesium metal is vaporized in a copper oven 14 at a suitable temperature. The cesium vapor atoms escape through a collimator device 16 mounted to the oven 14 to form an atomic beam, the collimator 16 being oriented to direct the beam along the longitudinal or optical axis of the tube 10.

Figure 2:
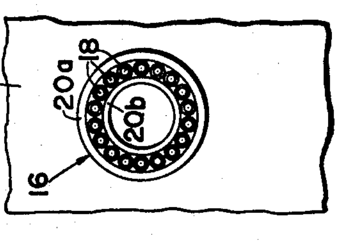
FIG. 2 is an enlarged view of the configuration of the ring-like atom source utilized in the inventive tube, taken along lines 2—2 of FIG. 1.

In accordance with one feature of this invention, the collimator device 16, depicted in FIG. 2, is formed from a multiplicity of short cylindrical tubes 18 of stainless steel or other suitable material, such as a nickel copper alloy sold under the trademark Monel by the International Nickel Co., which are arrayed in a ring-like fashion and supported between concentric walls of copper or other material which form part of the wall of the oven 14. The cylindrical tubes 18 may be square, triangular, or other convenient shapes in cross-section, as well as circular, and more than one layer may be supported between the walls 20*a, b*. The longitudinal axes of the cylindrical tubes 18 are aligned substantially parallel to the axis 24 of the tube 10, or are inclined slightly to direct the atoms into the gap of the state selector magnet 22. The center of the circular wall 20*b* is on the optical axis 24 of the tube 10.

The collimator 16 serves to project an atomic beam 21 having a cross-section substantially greater than that realized with the small area point source generally used in the prior art. Thus, the rate of emission of atoms from the collimator 16 is substantially increased, and the uniformity of beam configuration is greatly enhanced. The length and diameter of each collimator tube 18 is preferably less than the mean free path of the cesium atoms. The diameter of each tube 18 is approximately 0.003 inch, whereas the diameter of the copper wall 20*b* is about the same diameter as the gap of the multipole state selector magnet 22, which may be 0.2 inch for example.

Atoms of the hyperfine state $F=3$, $M=0$ in the beam are selected by a first state selector or A magnet 22, and are deflected through an oscillating microwave magnetic field developed by a microwave structure 24 powered by a microwave generator 26. In accordance with another feature of this invention, the selector magnet 22 is a quadrupole or hexapole magnet that provides a steady field of approximately 9000 gauss. Greater deflecting forces than that realized by dipole magnets for the same or larger solid angle are achieved by the multipole magnet, with resultant increased number of atoms reaching the detector.

A weak uniform polarizing field $H_0$ is applied to the beam in the presence of the microwave magnetic field by means of a suitable electromagnet, designated as the C-field magnet, formed by an elongated U-shaped channel member 28. The channel member 28 is made of a magnetic permeable material, such as a high permeability alloy steel sold under the trademark Mumetal by the Allegheny Ludlum Steel Corp., and is approximately 0.060 inch thick. The C-field magnet is energized by a C-field coil 30 wound along the base of the channel in the axial direction. The C-field coil 30 consists of relatively few turns and is supplied with a relatively low D.C. current to produce a low uniform C-field of approximately 60 milligauss, for example. The C-field intensity must be controlled to 3% to realize a frequency accuracy of 1 part in $10^{11}$. The C-field magnet is completely surrounded by shielding members, thereby minimizing the amount of stray magnetic field extending into the C-field region whereby the homogeneity of the C-field is maintained.

Figure 3:
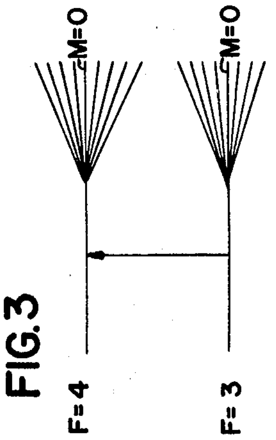
FIG. 3 depicts energy levels that are of interest in the present application.

If the frequency of the microwave oscillating magnetic field equals the atomic resonance frequency, the selected cesium atoms in the C-field region which are in the $F=3$, $M=0$ state experience a partial energy transition at a first arm 32 of the microwave structure 24, and at a second arm 24 undergo a final transition to the $F=4$, $M=0$ state, as illustrated in FIG. 3. The arms 32 and 34 are coupled to cut-off waveguides 36 and 38 respectively through which the beam passes to prevent power leakage.

Figure 4:
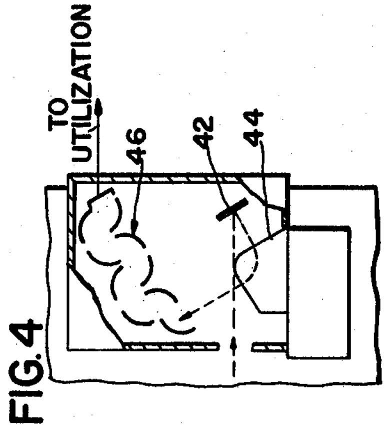
FIG. 4 is an enlarged view taken along lines 4—4 of FIG. 1.

Those atoms which are in the $F=4$ hyperfine state are directed through the magnetic shield 28 to a second state selector or B-field magnet 40, that is similar to the multipole magnet or first state selector 22. The B-magnet state selector 40 deflects only the $F=4$ atoms inwardly toward the optical axis. As a result, an optimum number of selected atoms impinge on a small button detector 42, depicted in FIG. 4. On the other hand, those atoms that have not undergone the transition are rejected or deflected away from the optical axis.

Those atoms in the $F=4$, $M=0$ group that arrive at the detector 42, which can be a hot tungsten electrode at 20 volts relative to ground, are ionized and directed through a mass spectrometer 44, which may comprise a C-magnet having wedge-shaped opposing pole tips. The spectrometer 44 provides a uniform field of approximately 2500 gauss and selects the heavy cesium ions while rejecting impurities such as light potassium atoms. The cesium ions are deflected to the first dynode of an electron multiplier 46, the first dynode being at about −2000 volts relative to ground. As a result, an amplified signal having an intensity representing the number of selected resonant frequency atoms detected by the detector 42 is developed. The output signal from the multiplier 46 is then fed to a utilization circuit, which in an atomic frequency standard comprises a feedback loop disposed between the cesium beam resonator and a crystal oscillator, as shown in FIG. 5.

Figure 5:
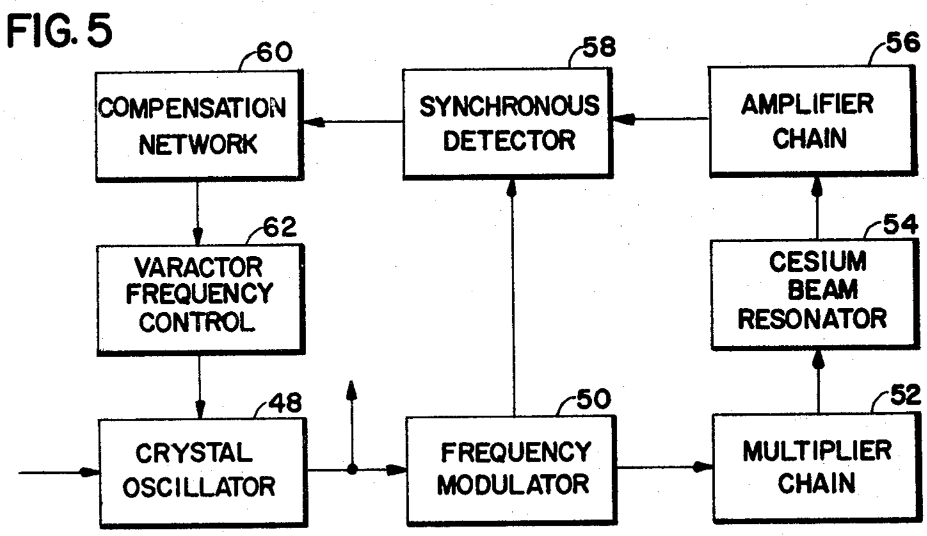
FIG. 5 is a block diagram of an atomic frequency standard which incorporates theh inventive tube.

In FIG. 5, a simplified block diagram represents the primary loop of an atomic frequency standard that regulates the frequencies of a primary crystal oscillator 48. A frequency modulator 50 shifts the phase of the output of the primary oscillator 48 in a sawtooth pattern, which is equivalent to a square wave frequency modulation at a modulating frequency of about 100 c.p.s. A multiplier chain 52 coherently converts the output of the frequency modulator 50 to the frequency of cesium resonance by means of a frequency multiplication by a factor of 1824. The cesium beam resonator 54, that is equivalent to the resonator tube of FIG. 1, develops an error signal at the modulation frequency, the error signal being proportional to the frequency deviation of the output signal received from the multiplier chain 52 relative to cesium resonance. A 100 c.p.s. amplifier chain 56 isolates and amplifies the error signal which, in turn, is converted to a direct current signal by a synchronous detector 58, that also receives a reference signal from the modulator 50. A compensation network 60 coupled to the detector 58 amplifies the D.C. error signal to such levels that are suitable for driving a varactor frequency control 62 coupled to the input of the primary crystal oscillator 48. The frequency control 62 adjusts the frequency of the primary oscillator 48 to precisely $1/1824$ times the frequency of the cesium resonance.

Figure 6:
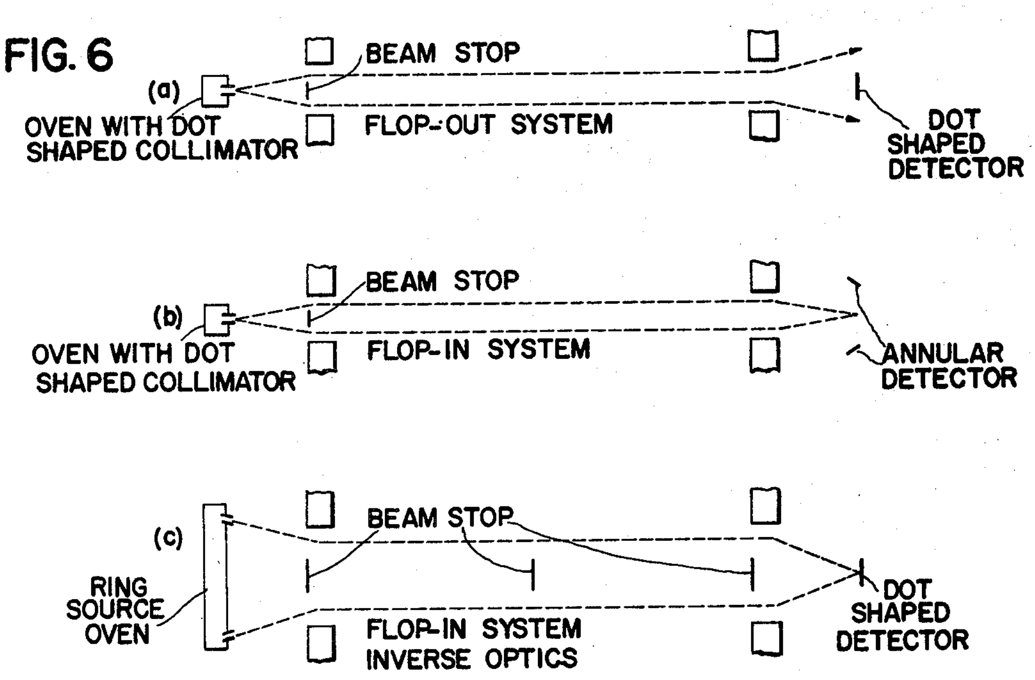
FIGS. 6*a–c* are representations of various beam paths to aid in the explanation of the invention.

FIG. 6 presents the contrast in beam optics or atom trajectories between prior art systems (*a*) and (*b*), and the inventive system (*c*). With a small dot-shaped collimator in a flop-out system and a small dot-shaped detector as in FIG. 6(*a*), atoms are deflected inwardly to the axis by the first state selector; and if the atoms undergo the desired transition between energy levels, they are deflected outward by the second state selector. Those atoms that do not make the transition and reach the selected energy level are deflected inward. Since the number of atoms deflected away from the detector, because they undergo the desired transition, is small compared to the total number reaching the detector in a flop-out system, the signal-to-noise ratio of the error signal will be relatively low, resulting in greater frequency instability for the frequency standard. In the flop-in system shown in FIG. 6(*b*), where a large annular detector is employed, the atoms that experience the transition are deflected outward from the axis. In this arrangement a large detector is necessary, which will require more power to keep it hot, and from which it is difficult to collect a large fraction of the ions leaving its surface if the atoms must pass through a mass spectrometer. In the arrangement delineated in FIG. 6(*c*), which approximates the inventive beam optics, the atoms from the ring-like source are first deflected inwardly, developing a trajectory in the C-magnet region that is substantially parallel to the system axis. Those atoms that undergo the desired transition are further deflected inwardly by the second state selector magnet toward the small area detector which serves to develop a signal of relatively high intensity. The beam stops in FIGS. 6*a*, *b*, and *c*, are used to prevent unwanted atoms from reaching the detector.

The small area detector does not have the high power requirements of larger annular detectors, and yet enables efficient detection of the selected cesium atoms with the system of the present invention. The inventive apparatus incorporates the preferred flop-in design with the small area detector, as well as using multipole state selector magnets for enhanced deflection.

The atomic beam tube apparatus described herein is not limited to the use of cesium atoms only. Certain isotopes of certain other metals such as thallium and rubidium may be used, by way of example. It is contemplated that any molecular or atomic beam having desired transition characteristics may be utilized, and the term "atomic beam" as used herein is not intended to be limited to a beam of cesium atoms. Also, the values, parameters and configurations set forth herein, such as the design of the microwave cavity, for example, may be modified or changed without departing from the scope of this invention.

What is claimed is:

1. An atomic beam tube comprising:

means including a source and an annular collimator for providing a beam of atoms along an axis;

said annular collimator comprising an array of hollow tubes, said array being concentrically disposed about the beam axis;

first state selector means for selecting atoms of a predetermined energy state;

means for effecting a transition of said atoms at a predetermined resonant frequency;

a button detector; and second state selector means for converging towards said button detector those atoms which have undergone the transition at the resonant frequency.

2. An atomic beam tube as in claim 1 wherein said hollow tubes have a diameter and a length less than the mean-free path of the atoms.

References Cited

UNITED STATES PATENTS

| | | | |
|---|---|---|---|
| 2,901,628 | 8/1959 | Lamb | 250—41.9 X |
| 2,972,115 | 2/1961 | Zacharias et al. | 331—3 |
| 3,060,385 | 10/1962 | Lipps et al. | 331—3 |
| 3,255,423 | 6/1966 | Ramsey et al. | 331—94 |

WILLIAM F. LINDQUIST, *Primary Examiner.*